United States Patent [19]

White et al.

[11] Patent Number: 4,869,865
[45] Date of Patent: Sep. 26, 1989

[54] METHOD OF MANUFACTURING NUCLEAR FUEL BUNDLE SPACERS

[75] Inventors: David W. White; Donald G. Muncy; Frederick C. Schoenig, Jr., all of Wilmington, N.C.

[73] Assignee: General Electric Company, San Jose, Calif.

[21] Appl. No.: 279,185

[22] Filed: Dec. 2, 1988

[51] Int. Cl.⁴ ............................................. G21C 21/00
[52] U.S. Cl. ...................................... 376/260; 29/430; 29/906
[58] Field of Search ........................ 376/260, 261, 463; 29/906, 723, 430, 455.1, 469, 160

[56] References Cited

U.S. PATENT DOCUMENTS

| | | | |
|---|---|---|---|
| 3,524,245 | 8/1970 | Searing | 29/430 |
| 3,890,196 | 6/1975 | Chetter | 376/441 |
| 4,508,679 | 4/1985 | Matzner et al. | 376/438 |
| 4,539,738 | 9/1985 | Antol et al. | 29/723 |
| 4,587,704 | 5/1986 | Matzner et al. | 29/160 |
| 4,711,436 | 12/1987 | Kobuck et al. | 376/261 |

Primary Examiner—Brooks H. Hunt
Assistant Examiner—Daniel Wasil
Attorney, Agent, or Firm—Robert R. Schroeder

[57] ABSTRACT

In the automated production line manufacture of nuclear fuel bundle spacers, rod-supporting ferrules are cut from tubular stock, checked for length, laser cut to create predetermined features in the ferrule sidewall, formed with rod-centering stops in the ferrule sidewall, and checked for stop height dimensional accuracy. Pairs of ferrules are subassembled with a captive spring and assembled into a spacer assembly fixture together with other spacer parts. The fixtured spacer parts are conjoined by laser welding to create a structurally rigid spacer. The various production line operating stations are served by separate controllers linked to a central computer for production status reporting, parts traceability, and overall control purposes.

20 Claims, 5 Drawing Sheets

METHOD OF MANUFACTURING NUCLEAR FUEL BUNDLE SPACERS

BACKGROUND OF THE INVENTION

Nuclear power reactors are a well known source of energy. In one type of nuclear reactor the nuclear fuel is comprised of elongated rods formed of sealed cladding tubes of suitable material, such as a zirconium alloy, containing uranium oxide and/or plutonium oxide as the nuclear fuel. A number of these fuel rods are grouped together and contained in an open-ended tubular flow channel to form a separately removable fuel assembly or bundle. A sufficient number of these fuel bundles are arranged in a matrix, approximating a right circular cylinder, to form the nuclear reactor core capable of self-sustaining a fission reaction. The core is submerged in a fluid, such as light water, which serves both as a coolant and as a neutron moderator.

A typical fuel bundle is formed by an array of spaced fuel rods supported between upper and lower tie plates; the rods typically being in excess of ten feet in length, on the order of one-half inch in diameter and spaced from one another by a fraction of an inch. To provide proper coolant flow past the fuel rods it is important to maintain the rods in precisely controlled, spaced relation such as to prevent bowing and vibration during reactor operation. A plurality of fuel rod spacers are thus utilized at spaced intervals along the length of the fuel bundle for this purpose.

Design considerations of such fuel rod bundle spacers include the following: retention of rod-to-rod spacing; retention of fuel bundle shape; allowance for fuel rod thermal expansion; restriction of fuel rod vibration; ease of fuel bundle assembly; minimization of contact areas between spacer and fuel rods; maintenance of structural integrity of the spacer under normal and abnormal (such as seismic) loads; minimization of reactor coolant flow distortion and restriction; maximization of thermal limits; minimization of parasitic neutron absorption; and minimization of manufacturing costs including adaptation to automated production.

Commonly assigned Matzner et al. U.S. Pat. No. 4,508,679 discloses and claims a nuclear fuel rod bundle spacer uniquely constructed to address these design concerns. As disclosed therein, a spacer is formed of an array of conjoined tubular cells or ferrules surrounded by a peripheral support band, each ferrule bore thus providing a passage through which a fuel rod or other elongated element of the fuel bundle is inserted. The ferrules are spot welded together and to the peripheral support band to provide an assembly of high structural strength, wherein the thickness of the metal used to form the peripheral support band and ferrules can be minimized to reduce coolant flow resistance and parasitic neutron absorption. Neutron absorption is further decreased by forming the ferrules and peripheral support band of low neutron absorption cross section material.

The rods or elements extending through the ferrules are centered and laterally supported therein between rigid projections and resilient members. The rigid projections or stops are inwardly formed as fluted or dimpled portions of the ferrule wall at locations near the upper and lower ferrule edges to maximize the axial distance therebetween and thus enhance fuel rod support. The stops are also angularly oriented to minimize projected area and thus disturbance of coolant flow.

The resilient members take the form of slender continuous loop springs of generally elliptical shape held captive by oppositely directed tabs formed by C-shaped cutouts in the walls of a pair of adjacent ferrules, whereby the two sides of each spring member project into the bores of its ferrule pair. Thus, a single spring serves two ferrules in biasing the fuel rods into contact with the two axially spaced pairs of stops pursuant to centering them in the ferrule bores.

A typical large nuclear reactor core may include on the order of 800 fuel rod bundles, each with as many as seven spacers, and each spacer may comprise sixty fuel or more rod-positioning ferrules. From this, it is seen that automated, expedited production of a rather involved assembly of many piece parts to manufacture a nuclear fuel rod spacer of such construction is of vital necessity.

It is accordingly an object of the present invention to provide a manufacturing process for producing nuclear fuel rod spacers on an expedited, essentially automated production line basis.

A further object is to provide a manufacturing process of the above-character wherein human participation is minimized.

An additional object is to provide a manufacturing process of the above-character wherein accountability records identifying the raw materials going into the spacer production are maintained.

Another object is to provide a manufacturing process of the above character wherein quality assurance checks are performed at strategic points in the production line flow of parts and parts assemblies.

A still further object is to provide a manufacturing process of the above character wherein the status of each operating station along the production line is monitored on an essentially real-time basis.

Yet another object is to provide a manufacturing process of the above-character wherein operating station data is processed to detect and alert personnel to process trends calling for corrective action.

A still further object is to provide a manufacturing process of the above-character wherein the potential for production error is minimized.

Other objects of the invention will in part be obvious and in part appear hereinafter.

SUMMARY OF THE INVENTION

In accordance with the present invention, there is provided a method of manufacturing nuclear fuel bundle spacers on an essentially automated production line basis. To this end, ferrules are cut from elongated seamless tubular stock; endfaced, chamfered and checked to assure a prescribed uniform length. The ferrules are conveyed to a laser cutting station where programmed feature cuts are made in the sidewall of each ferrule. Next the ferrules are conveyed to a station where a reaming operation is performed to remove any slag left by the feature cutting operation and to impart a desired finish to the inner diameter surface of each ferrule. A forming station next creates a pair of angularly spaced stops in the ferrule sidewall at each ferrule end. From this station the formed ferrules are delivered to a quality assurance station where the height of each of the four ferrule stops is check for dimensional tolerance on an automated basis, and those ferrules failing this test are automatically rejected from the production line.

The accepted ferrules are accummulated in baskets for conveyance through a cleaning station. The cleansed ferrules are visually inspected on a random basis as a check that the production line to this point is functioning properly. The ferrules are then fed into an assembly station where a spring is assembled to each consecutive pair of ferrules, and the resulting subassembly is loaded into a spacer assembly fixture, all on an automated basis. When a fixture is fully loaded with ferrule pairs, each with a captive spring, a peripheral band is manually assembled into the fixture in sections. The spacer assembly fixture is then manually transferred to a laser welding station where it is variously positioned to effect a multiplicity of weldments conjoining the spacer parts into a rigid spacer assembly. The completed spacer is then transferred to a buffing station to remove any tool marks and to create a cosmetically pleasing exterior appearance.

The various stations along the spacer production line are served by separate programmable logic controllers, each linked with a process computer. These controllers control their station operations on a stand-alone basis and are repeatedly polled by the process computer as to their station's operating status. The process computer has the ability to halt the operations at certain stations if undesirable trends are detected, such as excessive part rejections for out of tolerance ferrule length and stop height dimensions. The process computer, acting via the controllers, also coordinates the various station operations to assure a smooth and regulated parts flow along the production line. At various points along the production line, information is entered into the host computer to create a record tracing each spacer exiting the manufacturing process back to the fixture utilized in its assembly and ultimately to the particular lot of tubing from which the ferrules were cut.

For a full understanding of the nature and objects of the present invention, reference may be had to the following Detailed Description taken in conjuction with the accompanying drawings, in which.

Corresponding reference numerals refer to like parts throughout the several views of the drawings.

DETAILED DESCRIPTION

Figure 1:
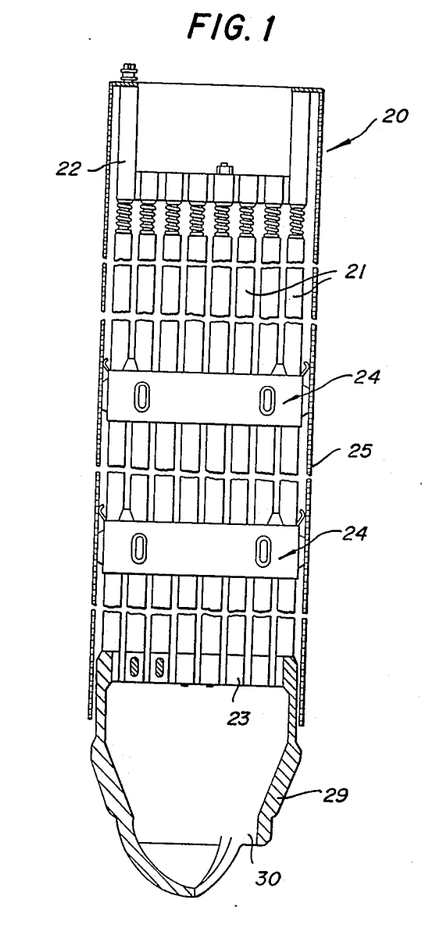
FIG. 1 is an elevational view, partially broken away, of a nuclear fuel bundle.

A fuel bundle, generally indicated at 20 in FIG. 1 comprises a plurality of fuel elements or rods 21 supported between a skeletonized upper tie plate 22 and a skeletonized lower tie plate 23. The fuel rods 21 pass through a plurality of fuel rod spacers 24 which provide intermediate support to retain the elongated rods in spaced relation and restrain them from lateral vibration.

Each of the fuel rods 21 is formed of an elongated cladding tube containing fissile fuel and other materials, such as fertile fuel, burnable poison, inert material or the like, sealed in the tube by upper and lower end plugs which are engaged by the upper and lower tie plates.

The fuel bundle 20 further includes a thin-walled tubular flow channel 25 of substantially square cross section, sized to form a sliding fit over the upper and lower tie plates 22 and 23 and the spacers 24 so that the channel may readily be mounted and removed. The lower tie plate 23 is formed with a nose piece 29 adapted to support the fuel bundle 20 in a socket of a core support plate (not shown) in the reactor pressure vessel. The end of this nose piece is formed with openings 30 to receive pressurized coolant which flows upwardly through the fuel bundle.

Figure 2:
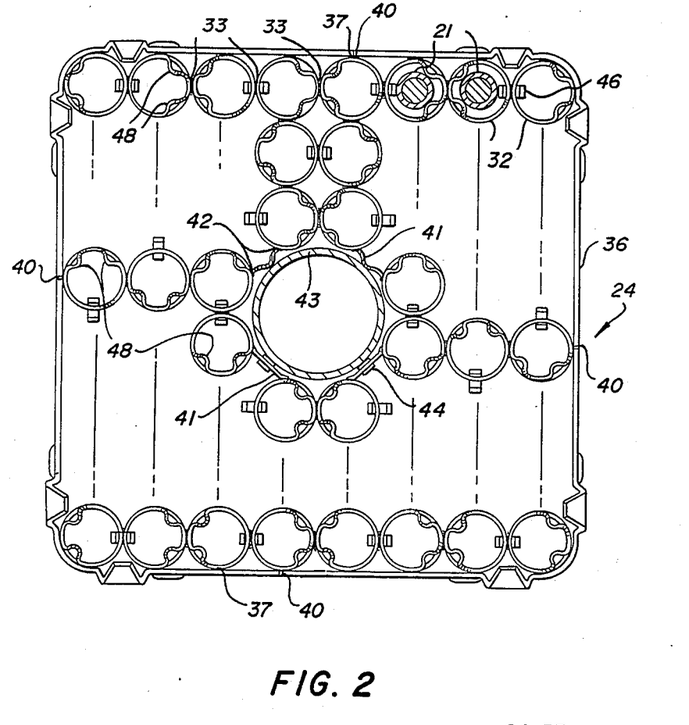
FIG. 2 is a plan view of a nuclear fuel rod spacer utilized in the fuel bundle of FIG. 1.
Figure 3:
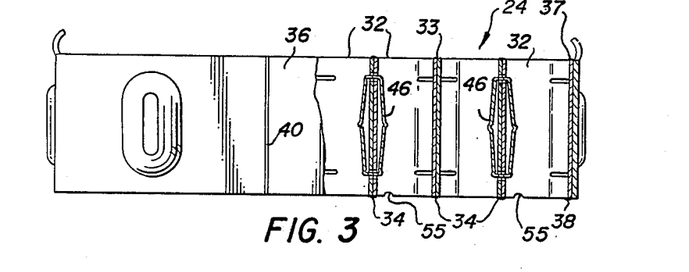
FIG. 3 is a side view, partially broken away, of the spacer of FIG. 2.

Spacer 24, as in FIGS. 2 and 3, is made up of cells or ferrules 32 arranged in a matrix array with their points of peripheral abutment conjoined by weldments at their upper and lower edges, as illustrated at 33 and 34. The bore of each ferrule provides a passage for an elongated element of the fuel assembly, such as fuel rod 21.

A perimetrical band 36 is conjoined to the upper and lower edges of the peripheral ferrules of the assembled matrix at their points of abutment by spot welds 37 and 38. This peripheral support band is assembled in four similar L-shaped pieces, each positioned about a corner of the ferrule array with their abutting ends joined by a seam weld 40. Straps 41 are welded, as indicated at 42, to the ferrules bounding a central opening in spacer 24 for accomodating a water pipe 43. Pipe-engaging springs 44 are carried by a pair of these straps to prevent vibration.

Figure 4:
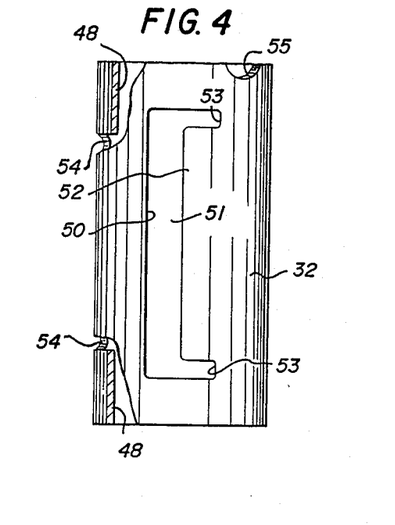
FIG. 4 is an elevational view, partially broken away, of a fuel rod-positioning ferrule utilized in the spacer of FIGS. 2 and 3.

Fuel rods 21, or other elongated elements, extending through the ferrule bores are centered and laterally supported therein between a resilient spring 46 and generally oppositely positioned axially spaced pairs of relatively rigid projections or stops 48, as best seen in FIG. 4. These stops are formed integrally with each ferrule as laterally spaced pairs of inwardly projecting, fluted portions of the ferrule wall near the upper and lower edges thereof.

Each spring, as best seen in FIG. 3, is in the form of a double-sided, continuous-loop spring which is assembled to each of separate pairs of adjacent ferrules. Thus, the two sides of the spring respectively project into the bores of the ferrule pair to which it is assembled to effect its rod-centering function with respect to both ferrules of the pair.

Figure 5:
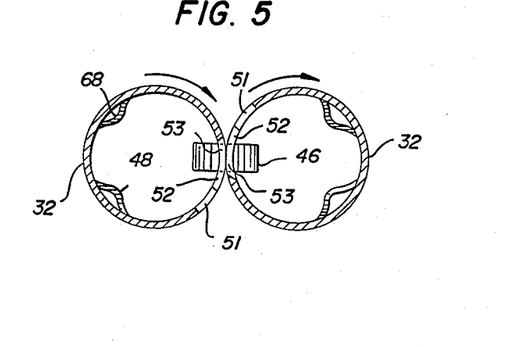
FIG. 5, is a horizontal sectional view of a ferrule pair-captive spring subassembly utilized in the assembly of the spacer of FIGS. 2 and 3.

To retain a spring 46 in captive subassemble with a pair of ferrules 32, each ferrule is formed, as seen in FIG. 4, with a C-shaped cutout 50 in its wall to provide a longitudinally elongated central opening 51 and a circumferentially projecting tab 52 flanked by circumferentially extending notches 53. Initially the ferrules of a pair are juxtaposed in side-by-side relation with their cutout openings 51 in aligned, confronting relation. A spring 46 is then centered in the aligned openings, and the ferrules are rotated on their axes in opposite directions. Tabs 52 are thus swung in opposite directions through the open interior of the spring which then becomes captured in the cooperating, effectively closed notches 53 of the ferrule pair, as seen in FIG. 5.

In the same operation creating C-shaped cutout 50, slits 54 (FIG. 4) are cut in the ferrule wall to faciltate the subsequent forming operation in creating stops 48.

In addition, a reference notch 55 is cut in one edge of the ferrule for utilization in subsequent operations to ensure requisite end-to-end and angular orientations of each ferrule called for by the processing step performed thereat.

Figure 6:
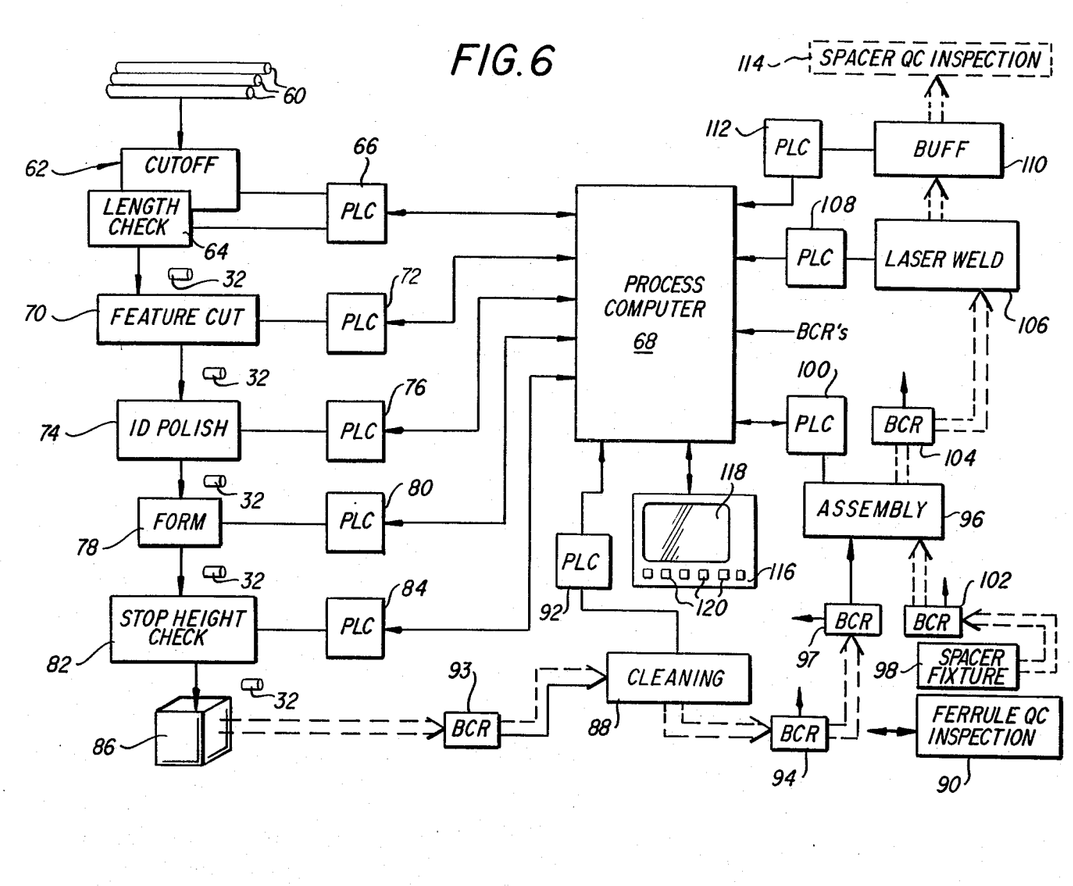
FIG. 6 is a schematic block diagram illustrating the various process steps practiced in the nuclear fuel bundle spacer manufacturing method of the present invention.

The manufacturing process in accordance with present invention for producing spacers 24 on an expedited, essentially automated production line basis is illustrated diagrammatically in FIG. 6. Thus, a designated lot of seamless metal tubes 60 of low neutron absorpotion cross section such as a zirconium alloy, for example Zircaloy-2, is queued up at a cutoff station, generally indicated at 62. The tubes, having an outer diameter of about 0.64 inches (16.2 mm) and a wall thickness of about 0.02 inches (0.5 mm), are successively axially presented to a screw machine, such as an Ultramatic screw machine manufactured by Brown & Sharpe, which has been suitably modified for this operation. Ferrules are cut from the tubes in a precise, uniform length of about 1.2 inches (3 cm). The screw machine is equipped with suitable attachments for end facing and chamferring both ends of the ferrule. Upon completion of this machining operation, the length of each ferrule is checked, as indicated at 64, to ensure the integrity of this dimension, and out of length tolerance ferrules are automatically ejected from the production line. A suitable length check instrumentality may be, for example, a commercially available eddy current or laser probe capable of precisely acquiring the length of each ferrule as it is discharged by the screw machine. Serving station 62 is a programmable logic controller 66, such as a General Electric Company Series One Plus controller. This controller is programmed to control the operating sequence of the screw machine and to monitor station operation. The station operating status is made available to a process computer 68 on a polled basis. Production statistics, such as production rate, output count, and length check failure count, are acquired by controller 66 and communicated to computer 68. Periodic calibration of the length check instrument 64 is also performed by the computer, and controller 66 is conditioned accordingly to evaluate the length check output signals for dimension acceptability and to automatically eject ferrules of unacceptable lengths on a standalone basis. The various data are analyzed by computer 68 to detect process trends in the cutoff station. If an undesirable trending toward process limits is detected, the computer shuts down cutoff station 62 and signals for corrective action by maintenance personnel. Thus, excessive material waste is avoided.

Ferrules 32 of requisite length are conveyed to a feature cut station 70. Here the ferrules are automatically handled for cutting C-shaped cutout 50, slits 54 and reference notch 55 at precisely controlled locations in the wall of each ferrule. Preferably, this feature cut station is of the construction and operation disclosed and claimed in the commonly assigned, copending Muncy et al. application Ser. No. 07/279007 (Docket No. 24-NF-05012), entitled "Apparatus for Machining Intricate Feature Cuts in Thin Walled Tubular Parts". Thus, feature cut station 70, preferably includes ferrule handling apparatus for presenting a pair of ferrules to a twin beam cutting laser, such as a Coherent General Model M48-2 $CO_2$ laser. The pair of ferrules are mounted on separate arbors and are synchronously articulate relative to the separate, impinging laser beams to simultaneously effect the various feature cuts in the ferrule walls, i.e., cutout 50, slits 54 and notch 55, at relative locations precisely controlled by a computer numerical control (CNC), such as a Genersl Electric Company MC 2000, operating in conjunction with a programmable logic controller 72. This controller, which also may be a General Electric Company Series One Plus controller, like cutoff station controller 66, is linked to process computer 68 to keep the latter advised of feature cut station status on a polled basis. Laser operating parameters are communicated to the computer via controller 72 where they are analyzed for process trends. The computer can shutdown station 70 and call for corrective action if a production-jeopardizing trend is indicated. Production statistical data is also passed on to the computer for recordkeeping purposes. Modulating visible beams monitor the cutting operation to assure that the feature cuts are being successfully effected and advises controller 72 accordingly. If not, the controller shuts down this station and alerts the computer when next polled on a repeating basis, e.g., every two seconds. The computer then alerts personnel to this situation.

The feature cut ferrules are then conveyed to a polishing station 74 where the inner diameter surface is lightly machined to remove any remnant laser cutting slag and to impart a desired surface finish. This is basically a reaming operation wherein ferrules are automatically fed successively into a chuck from a vibratory feeder for presentation to a tungsten carbide reaming tool penetrating the ferrule bore. Operation of this station is controlled on a standalone basis by a controller 76 of the same type as controller 66 and 72, which is also linked to computer 68 for polled station status reporting. Sensors monitor the number of ferrules queued up for this reaming operation and signal controller 76 to activate the feeder to replenish the queue when necessary. Other sensors monitor the progress of ferrules through this station and advise the controller in the event of a malfunction. Statistical production data are acquired by the controller and periodically passed in to the computer. Station 74 is shut down by its controller for various reasons, such as a malfunction, empty queue, empty feeder, etc., and the computer for other reasons, such as end of shift, ferrule production quota reached, production line halt due to a shutdown of another station, etc.

From the ID polish station, the ferrules 32 are conveyed to a forming station 78 which is preferably constructed in the manner described and claimed in commonly assigned King et al. copending application Ser. No. 07/279009 (Docket No. 24-NF-05009) entitled "Automated Forming Apparatus". Thus, this station includes a hopper into which ferrules conveyed from station 74 are accummulated. As needed, a quantity of ferrules is discharged from the hopper into a vibratory feeder which serializes the ferrules for delivery through an inclined tube. Stationed along this delivery tube is a reorienting mechanism which looks for the notch 55 in the leading edge of each ferrule and inverts those ferrules arriving un-notched end first. The ferrules, all oriented notched end first, then gravitate in succession to a mechanism which finds this notch and, in so doing, retains each successive ferrule in a desired angular orientation. A pick and place mechanism then grips each ferrule and, without disturbing its prescribed angular orientation, places it in a die where the four stops 48 are simultaneously formed in the ferrule wall.

Forming station 78 is likewise served by a separate controller 80 which is programmed to coordinate and control the various station operations. This controller is similarly linked with process computer 68 to provide the same types of station information as in the case of stations 62, 70 and 74.

The formed ferrules 32 exit forming station 78 and are serially delivered to a stop height check station 82 which is preferably constructed in the manner described and claimed in commonly assigned, Reeves et al. copending application Ser. No. 07/279008 entitled "Automated Gauging Apparatus". Here each successive ferrule is end-for-end reoriented, if necessary, and angularly oriented, using notch 55 in both cases. Thus oriented, a pick and place mechanism inserts each ferrule on an arbor in a position where a plurality of eddy current probes can gauge the height of each stop relative to contiguous sites on the ferrule peripheral surface. Ferrules found to have an out-of-tolerance stop height dimension are automatically ejected from the production line. Operational control of this station is provided by a separate controller 84 of the same type as the previously described controllers. Station status, as well as statistical data regarding the numbers of ferrules accepted and rejected, are communicated to computer 68 when polled. The computer shuts down this station and typically forming station 78 as well, if an inordinate number of ferrules failing this stop height check is reported. As described in the above-cited copending application, computer 68 also serves to calibrate the eddy current probes.

Ferrules passing the stop height check station are accummulated in baskets 86 for conveyance through a cleaning station 88. Here the ferrules are automatically processed through two degrease tanks, two DI water rinse tanks, and a dryer. Upon exiting the cleaning station, the baskets of ferrules are conveyed to a ferrule QC inspection station 90, where ferrules are randomly inspected by a quality assurance technician to determine that the ferrule production line portion of the spacer manufacturing process is functioning properly. Operation of the cleaning station is controlled by a controller 92 which advises computer 68 of the station status, operating parameters, etc., when polled. Each basket 86 carries a label bearing a unique bar code which is read by a reader 93 upon entering the cleaning station and a separate reader 94 upon exiting this station. The bar code reader outputs are fed to the computer for purposes of associating the finished ferrules with the particular tube lot from which they were cut and to track the baskets 86 through the cleaning station.

After ferrule QC inspection at station 90, each basket of ferrules is conveyed to an assembly station 96. Enroute, the basket bar code is read by a reader 97 and entered in computer 68 to verify that the baskets of ferrules have passed QC inspection and are of the proper type. Assembly station 96 is preferably constructed in the manner described and claimed in commonly assigned Moreno et al. copending application Ser. No. 07/279006 entitled "Automated Assembly Apparatus". Thus, each basket of ferrules conveyed to this station is emptied into a hopper from which limited quantities are discharged into a vibratory bowl feeder on an as needed basis. The ferrules exit this feeder in a serial stream and gravitate down an inclined chute to a mechanism acting to longitudinally reorient the ferrules end for end (if necessary) using notch 55 and to divert the ferrules into two parallel queues at a loading head. Successive pairs of ferrules are then angularly oriented to align the longitudinal openings 51 of their C-shaped cutouts 50 (FIG. 4) in confronting relation. The loading head then loads the angularly oriented pair of ferrules on separate posts of a ferrule fixture indexed into position on a rotation table. The loaded fixture is then indexed to a position where a spring 46 is automatically assembled to the ferrule pair. The ferrule fixture is then indexed to a spring capturing position where the pair of ferrules are incrementally rotated in opposite directions to capture the spring in the manner described above in connection with FIG. 5. The fixture is then indexed to a spacer assembly position where a pick and place mechanism picks the ferrule pair with captive spring from the ferrule fixture and places this subassembly into a spacer fixture, diagramatically indicated at 98 in FIG. 6 herein. The spacer fixture is variously positioned by a three-axes positioning table such that each ferrule pair subassembly placement is made at a different spacer fixture location, all as disclosed in the cited copending application Ser. No. 07/279006. A spacer fixture is thus filled in an orderly manner to create the matrix array of ferrules seen in FIG. 2. The assembly station utilizes four ferrule fixtures to enable the four steps in the assembly process to be effected in phased relation with respect to four successive pairs of ferrules at a time.

Assembly station 96 is served by a programmable logic controller 100, such as a General Electric Company Series-Six controller, on a standalone basis. As in the case of the other stations, this controller appraises computer 68 of station status and statistical production data when polled. Controller coordinates the various assembly station operations, including the positioning of spacer fixture 98 during the assembly of ferrule pairs therein. The assembly station is shut down by its controller in the event of a malfunction, and the computer, upon being advised, alerts maintenance personnel to this fact. When called for by events at other stations, the computer can shut down the assembly station.

Each spacer fixture 98 carries a bar coded label which is read into the computer by a reader 102 prior to placement in assembly station 96 to verify a proper match of spacer and fixture types. After a spacer fixture has been fully assembled with ferrules, and the four sections of perimetrical band 36 and straps 41 with springs 44 (FIG. 2) have been manually positioned in the spacer fixture, the fixture bar code is again read by a different reader 104. This fixture identifying data is entered into computer 68 for fixture tracking purposes.

Each spacer fixture 98 containing the various spacer parts in full assembly is transferred to a welding station 106 where it is placed on a multi-axes positioner, as disclosed and claimed in commonly assigned Muncy et al. copending application Ser. No. 07/279010 entitled "System for Automated Welding of Parts Assembly in Controlled Environment". The spacer fixture is placed on the positioner located within a weld box containing an inert gas atmosphere and is variously positioned and translated to effect the multiplicity of welds 32, 33, 37, 42 and seam welds 40 (FIGS. 2 and 3) to conjoin the spacer parts into a structurally rigid spacer assembly 24 (FIG. 2), all in an uninterrupted welding operation. Welding is produced by a laser beam generated by a suitable laser welder, such as a Coherent General Model S-51 $CO_2$ laser capable of 1500 watts peak power.

Welding station operation is controlled by a computer numerical control (CNC) operating in conjunction with a programmable logic controller 108 which apprises computer 68 of station status and various welding operating parameters on a polled basis. Fixture positioning during the laser welding process is controlled by controller 108. At the conclusion of each welding process, a separate laser, such as Coherent General Model M-815 Nd:YAG laser engraves a unique alphanumeric serial number, assigned by computer 68, on the surface of band 36. The computer matches the spacer serial number of each spacer with the bar code designation of the particular fixture 98 used in its assembly.

The completed spacer 24 is removed from its fixture and placed on a conveyor leading to a buffing station 110 where a specially tooled and programmed robot lifts each spacer from an conveyor, presents all four spacer sides to a buffing wheel, and places the buffed spacer on an outgoing conveyor. This operation removes any tool marks and imparts a cosmeticaly pleasing appearance to the exterior spacer surfaces. Station operation is controlled by a controller 112 which is linked to computer to indicate, when polled, station status, production counts, etc. At this conclusion of the spacer manufacturing process, each spacer undergoes final QC inspection at a station 114. Here the spacers are visually inspected for appearance, weld integrity, part misplacements, missing parts, etc. If a spacer defect is noted, the quality assurance technician enters the serial number of the defective spacer into computer 68 via an operator interface terminal 116 and obtains a display or printout tracing the defective spacer back through its manufacturing process to the particular fixture involved in its assembly, the identities of tube lot from which the ferrules were cut, and the spring, band and strap lots.

Figure 7:
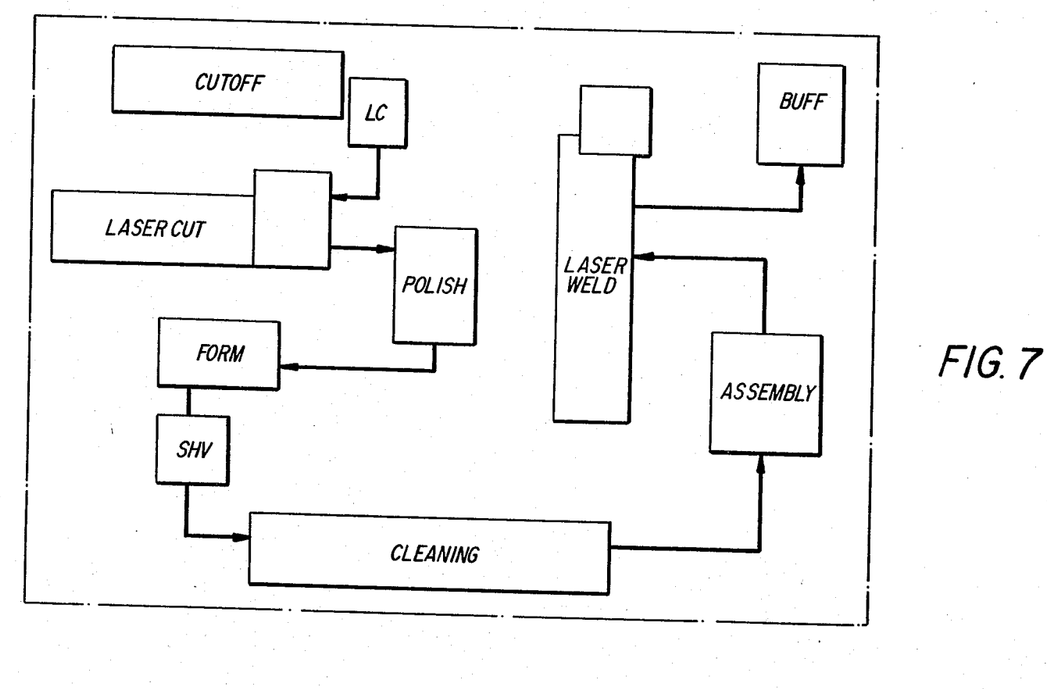
FIG. 7 is a depiction of a computer generated display of the overall manufacturing method of FIG. 6.

FIG. 7 depicts a manufacturing process overview display which is normally presented on the CRT screen 118 of operator interface terminal 116. This display diagramatically portrays the various operating stations in their production line relation. The display of each station is generated in various colors indicative of their current status. Thus, a station displayed in green may indicate normal operation, while a station displayed in red may indicate that it has been shut down either by its controller or by computer 68. Other colors may be used to indicate varying degrees of concern, e.g., the station bears watching, or the station is an imminent danger of being shut down. This overview display is updated as each station is polled, e.g., every two seconds.

Terminal 116 is equipped with a plurality of function buttons 120 utilized for control and reporting purposes. Depression of one button causes a menu to be presented affording the option to display the status of a particular station or the status of an on-going production run including the spacer type involved and identifications of the materials being utilized, i.e., tube lot, spring lot, etc. A second button presents a menu with the options to start any particular one or all of the stations. If the option to start a particular station or stations is excercised, but the computer determines that it should not be started, this situation is displayed with an explanation, e.g., station is non-operational, station needs recalibration or retooling, next station hopper is full, etc.

Another button presents a menu giving the option to stop any one or all of the stations. A fourth button is depressed to enable operator entry of a basket or fixture identification number in the event of a misread by any of the bar code readers. A fifth button is used to control the various steps, such as retooling and recalibration, necessary to changeover the various stations to a different spacer type. As each step is completed, the computer is notified. The computer inhibits startup of the stations until it is advised that all of the changeover steps have been performed.

A sixth function button enables the entry of new lot numbers for the parts involved in the spacer manufacture. This button is also used to call up the numbers of the part lots involved in current production and the number of parts remaining in each lot. Another button enables the entry of QC inspection reports developed at stations 90 and 114. If the ferrules and the finished spacers are accepted upon visual examination, an accept entry is made, together with the basket or spacer ID number. If not accepted, a different entry is made, and a menu is displayed of the various reject catagories from which the applicable one or several are indicated by their designated entries. The basket ID number containing rejected ferrules or the serial number of the rejected spacer is also entered at this time. Another button is depressed to acknowledge operator awareness of an alarm condition at any station.

It is seen from the foregoing description that the objects set forth above, including those made apparent hereinabove, are efficiently attained, and, since certain changes may be made in the disclosed embodiment without departing from the invention, it is intended that all matters contained herein be taken as illustrative and not in a limiting sense.

Having described the invention, what is claimed as new and desired to secure by Letter Patent is:

1. A method of manufacturing nuclear fuel bundle spacers on an automated production line basis comprising the steps of:
   A. cutting elongated tubing stock into shorter tubular ferrules;
   B. checking the length of each ferrule and rejecting those ferrules of unacceptable lengths;
   C. cutting predetermined features in the sidewall of each ferrule;
   D. forming the sidewall of each ferrule to impart predetermined surface formations thereto;
   E. checking a critical dimension of each sidewall surface formation of each ferrule and rejecting those ferrules of unacceptable surface formation critical dimensions;
   F. assembling successive pairs of ferrules with a single captive spring into subassemblies;
   G. assembling successive subassemblies into a spacer assembly fixture;
   H. assembling a peripheral band in the spacer assembly fixture;
   I. conjoining the ferrules to each other and to the peripheral band at selected sites of mutual contact to create a structurally rigid, finished spacer;
   J. providing a separate controller for automatically controlling and monitoring the performances of steps A through G and I on a standalone basis and for reporting status and production information to a common manufacturing process computer.

2. The manufacturing method defined in claim 1, which further includes the step of polishing the inner diameter surface of each ferrule subsequent to said feature cutting step C and prior to said forming step D.

3. The manufacturing method defined in claim 2, which further includes the step of cleaning the ferrules subsequent to said critical dimension checking step E and prior to said assembling step F.

4. The manufacturing method defined in claim 3, which further includes the step of buffing the exterior surfaces of each finished spacer.

5. The manufacturing method defined in claim 1, wherein said feature cutting step C is performed by a laser cutting beam.

6. The manufacturing method defined in claim 1, wherein said conjoining step I is performed by a laser welding beam.

7. The manufacturing method defined in claim 1, wherein said feature cutting step includes the creation of a reference notch in one edge of each ferrule for utilization in said deforming steps D, said critical dimension checking step E and said assembling step F to achieve a requisite ferrule orientation.

8. The manufacturing method defined in claim 1, which further includes the step of automatically engraving a unique serial number assigned by the computer on each finished spacer.

9. The manufacturing method defined in claim 8, wherein said conjoining step I is performed by a laser welding beam and said serial number engaving step is performed by a laser scribing beam, said conjoining and engraving steps being carried out in an inert gas atmosphere.

10. The manufacturing method defined in claim 8, which further includes the step of reading into the computer a coded fixture label uniquely identifying each spacer assembly fixture utilized in said assembling steps G and H, thereby enabling the computer to match up each finished spacer by its serial number with the particular fixture utilized in its assembly.

11. The manufacturing method defined in claim 10, which further includes the step of entering into the computer data uniquely identifying the tubing, spring and band lots utilized in the production of each spacer, thereby enabling the computer to trace each finished spacer back to the source of the parts utilized in its assembly.

12. The manufacturing method defined in claim 11, which further includes the step of programming the computer to poll the various controllers on a regular repeating basis for status and production information, to impose overall production line control of the various manufacturing steps, to recognize process excursions ongoing with any of the manufacturing steps, and to issue warnings and alarms, as appropriate, with regard to any of the manufacturing steps.

13. The manufacturing method defined in claim 11, which further includes the steps of accumulating ferrules accepted from said critical dimension checking step E in baskets for conveyance through a cleaning station, and reading into the computer a coded basket label uniquely identifying each basket of ferrules both upon entry into and exit from the cleaning station, whereby to provide a basket tracking record in the computer.

14. The manufacturing method defined in claim 13, which further includes the steps of visually inspecting the ferrules in each basket exiting the cleaning station, and entering into the computer the results of this inspection together with basket identifying data noted from its coded lable.

15. The manufacturing method defined in claim 14, which further includes the steps of visually inspecting each finished spacer, and entering into the computer the results of each inspection together with the serial number of the inspected spacer.

16. The manufacturing method defined in claim 15, wherein said feature cutting step is performed by a laser cutting beam, said conjoining step is performed in an inert gas atmosphere by a laser welding beam, and said engraving step is performed by a laser scribing beam.

17. The manufacturing method defined in claim 16, wherein said feature cutting step includes the creation of a reference notch in one edge of each ferrule for utilization in said deforming step D, said critical dimension checking step E and said assembling step F to achieve a requisite ferrule orientation.

18. The manufacturing method defined in claim 17, which further includes the step of programming the computer to poll the various controllers on a regular repeating basis for status and production information, to impose overall production line control of the various manufacturing steps, to recognize process excursions ongoing with any of the manufacturing steps, and to issue warning and alarms, as appropriate, with regard to any of the manufacturing steps.

19. The manufacturing method defined in claim 18, which further includes the step of polishing the inner diameter surface of each ferrule subsequent to said feature cutting step C and prior to said deforming step D.

20. The manufacturing method defined in claim 19, which further includes the step of buffing the exterior surfaces of each finished spacer.

* * * * *